UNITED STATES PATENT OFFICE.

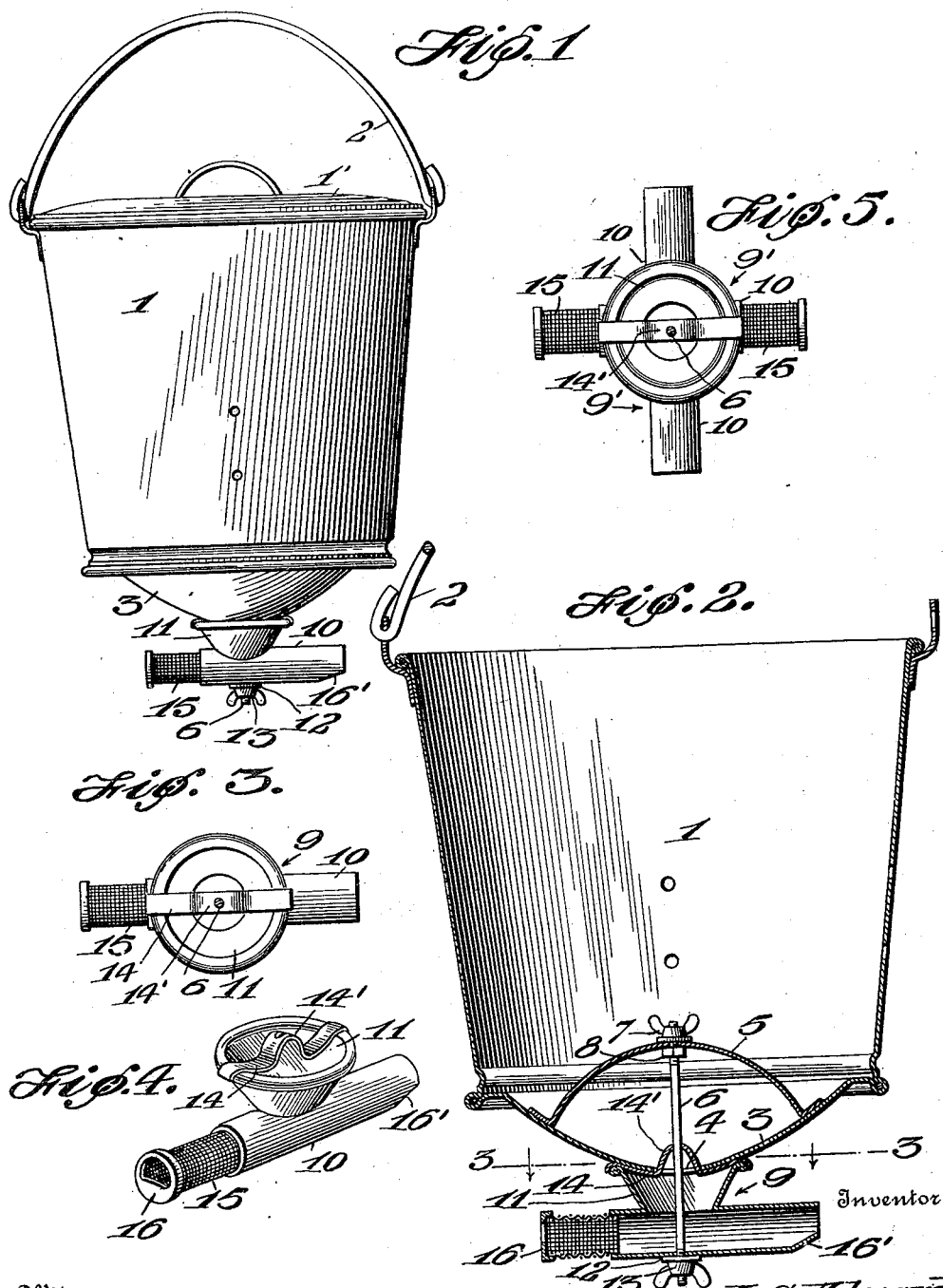

LOUIS C. EDWARDS, OF ELLINGTON, CONNECTICUT.

POULTRY-FEEDING DEVICE.

1,132,836.  Specification of Letters Patent.  Patented Mar. 23, 1915.

Application filed March 16, 1914. Serial No. 825,060.

*To all whom it may concern:*

Be it known that I, LOUIS C. EDWARDS, a citizen of the United States, residing at Ellington, in the county of Tolland and State of Connecticut, have invented certain new and useful Improvements in Poultry-Feeding Devices; and I do declare the following to be a full, clear, and exact description of the invention, such as will enable others skilled in the art to which it appertains to make and use the same.

My invention relates to new and useful improvements in poultry feeding devices and has for its primary object to provide a simply constructed device of this character having a combined baiting and distributing tube, operated by the fowls themselves, for discharging the grain from the feeder and for distributing it over a comparatively large area.

To the above end, I provide a centrifugal distributer, a secondary object of the invention being to construct said distributer in the most simple and inexpensive manner for producing the above mentioned result.

In the accompanying drawings: Figure 1 is a side elevation of my improved poultry feeder; Fig. 2 is a vertical section thereof; Fig. 3 is a horizontal section taken substantially upon the line 3—3 of Fig. 2; Fig. 4 is a detail perspective view of the form of distributer so far illustrated; and Fig. 5 is a horizontal sectional view similar to Fig. 3, showing a pair of distributers.

In the accompanying drawings, I have shown my improved poultry feeder as comprising a receptacle or hopper 1 which may be supported by means of a bail 2 or by suitable legs (not shown).

The lower end 3 of the hopper 1 may be of any suitable configuration for directing the feed, placed therein, toward a central opening 4 in said bottom.

Extending a suitable distance over the opening 4 is an arch 5 through which the threaded upper end of a bolt 6 passes and is rigidly secured thereto by means of upper and lower nuts 7 and 8 which are threaded into contact with the upper and lower sides of said arch, the nut 7 preferably being provided with wings.

It is upon the bolt 6 that my improved distributer 9 is revolubly mounted, said distributer including a tubular lower portion 10 and a funnel-shaped portion 11 which rises from said tubular portion and underlies the opening 4. As clearly shown in the drawings, the bolt 6 depends through the center of the funnel-shaped portion 11 and projects through the under side of the tube 10, its lower extremity being provided with a washer 12 and a winged thumb nut 13. This washer 12 serves as a bearing for the distributing tube 10 and the winged nut 13 as a check for said bearing washer, whereby the washer 12 is prevented from turning off the bolt 6 as the discharge tube revolves. By raising or lowering this washer and nut, the clamping or binding action between the washer and the tube may be varied and the speed of rotation of said tube 10 is thus controlled and the discharge of grain therefrom regulated according to the size of the grain to be fed or the amount it is desired to feed. For the purpose of maintaining the distributer 9 in proper relation in respect to the bolt 6, I provide the funnel-shaped portion 11 with a diametrical bearing strip 14 which has its central portion bent upwardly as indicated at 14′ to provide an agitator for loosening the feed within the opening 4. The upwardly bulged portion 14′ may be of any suitable configuration, it being here shown as of inverted V-shape.

For the purpose of allowing the food within the tube 10 to be in full view of the fowls, I preferably form one end of said tube of wire netting as indicated at 15, both ends of the tube being left open, the lower portion of the end formed of netting, being partially closed by an upright wall or lip 16 to retain a sufficient amount of feed in the tube to attract the fowls and cause them to peck at it through the openings in the side walls. This lip 16 also serves to obstruct the view of the feed from the end of the tube and thus prevent the fowls from pecking it out of said end without operating the distributer. The remaining end of said tube is provided with an upwardly and outwardly inclining deflecting plate 16′, said plate being here shown as formed integrally with this end of the tube and which performs the double function of a deflecting plate and of means for retarding the discharge of feed from the tube so that a sufficient amount will be retained therein for display through the openings in the baiting portion of the tube.

With the parts as above described, the hopper 1 may be filled with feed and a suitable covering 1' placed thereon. The distributer 9 is now rotated until some of the feed drops through the opening 4 and into the interior of the tube 10, through the wire netting 15 of which it will be visible to the fowls. The fowls, seeing the feed through the mesh, will now peck the same with their bills, this action causing the distributer 9 to rotate whereupon the feed will be discharged from the opposite ends of the tube 10 by the centrifugal force generated by the rotation of said tube. The deflecting plate 16' causes the food to rise slightly as it leaves this end of the tube and thus causes said food to travel a greater distance than would otherwise be possible.

By constructing the baiting tube and the distributer in the form of a single member communicating with the interior of the feed receptacle, the baiting tube will also serve to indicate when the supply in the receptacle has been exhausted without any examination of the receptacle itself being necessary so that if the person in charge when glancing at the feeder, observes no feed in the baiting portion of the tube, he will know that the feed in the receptacle needs replenishing. Moreover, by this construction, the baiting tube or basket is automatically filled by the fowl and the feed in said basket thus kept fresh.

From the above, it will be observed that I have provided a combined distributing tube and bait basket which is automatically filled and emptied and set in motion by the bill of the hen or other fowl feeding therefrom.

In Fig. 5 I have shown a horizontal sectional view and have illustrated the manner in which a pair of distributers 9' might well be employed, the construction and operation of these distributers being identical with that previously described.

From the foregoing description, taken in connection with the accompanying drawings, the construction and operation of the invention will be readily understood without requiring a more extended explanation.

Although I have described my invention with considerable minuteness, I do not wish to be limited to details of construction other than those amplified in the appended claims.

Having thus described my invention, what I claim as new and desire to secure by Letters Patent is:

1. A poultry feeder comprising a feed receptacle having a hopper-like bottom with a central opening forming an outlet, a centrifugal distributer beneath said outlet having an agitator extending upwardly into and spanning said outlet opening and engaging the side walls thereof for loosening the feed in and adjacent to said outlet, said distributer having a discharge opening and means for rotatably supporting said distributer.

2. A poultry feeder comprising a feed receptacle having an outlet in its lower end, a distributing tube mounted for rotation in a horizontal plane and having an opening located beneath the opening in said receptacle, a foraminous extension on one end of said tube, and an upright wall closing the lower portion of the outer end of said extension, whereby a quantity of feed will be trapped in said foraminous extension to be viewed by the poultry.

3. A poultry feeder comprising a receptacle having an outlet opening in its lower side, a rod depending through said opening, a horizontal distributing tube beneath said receptacle having an opening located beneath the opening therein, means for connecting said tube with said rod, a bearing bar carried by the tube, and spanning the opening therein, said bar having its central portion bulged upwardly into the opening in the receptacle and constituting an agitator, the latter having a perforation receiving said rod, and means for holding said rod in operative position.

4. A poultry feeder comprising a receptacle having a discharge opening, an upright rod passing through said opening, a funnel shaped member surrounding said rod beneath said opening, a bearing bar extending across the interior of said member and having its central portion bulged upwardly into said opening and centrally perforated, said perforation being provided for the reception of said rod, means for holding said rod in operative position and a distributing tube projecting laterally from the lower end of said member.

5. A poultry feeder comprising a feed receptacle having an outlet in its lower end, a combined distributing and baiting tube mounted for rotation in a horizontal plane and having an opening located beneath and communicating with the outlet in said receptacle, an extension on one end of said tube having openings in its side walls and an upright wall closing the lower portion of the outer end of said extension, whereby a quantity of feed will be trapped in said extension to be viewed by the poultry, and the other end of said tube being open and provided with means for retarding the discharge of feed therefrom.

6. An automatic poultry feeder comprising a feed container having an opening in the bottom thereof, a combined baiting and distributing tube mounted to revolve beneath said container and communicating with the opening therein, whereby said tube is supplied with feed from said container, said tube being open at both ends, one end having an upwardly extending lip at the lower edge thereof and the side walls of said tube having view openings therein, the other end of said tube having an upwardly and outwardly inclined deflecting and retarding plate at its lower edge.

7. A poultry feeder comprising a receptacle having an outlet opening in its lower side, a rod depending through said opening, a horizontal distributing tube beneath said receptacle and having an opening located beneath the outlet opening in such receptacle and a bearing bar carried by the tube and spanning the opening therein, said bar having its central portion bulged upwardly into the outlet opening in the receptacle and constituting an agitator, the latter having a perforation receiving said rod, said rod extending transversely through said tube and having its projecting end threaded, a nut on said threaded end, and a bearing washer on said rod between said nut and tube, whereby the binding action between said washer and tube may be varied for varying the revolving speed of said tube.

8. An automatic poultry feeder comprising a feed container, a distributer mounted to revolve in a horizontal plane below said container, a tubular member disposed between said container and distributer and communicating with both of them and frictionally engaging one of them and secured to the other, means for varying the frictional contact between said tubular member and the member on which it turns to control the speed of the distributer and thereby regulate the discharge of feed therefrom.

9. An automatic poultry feeder comprising a feed container having a discharge opening in its bottom, a distributer mounted to revolve in a horizontal plane below said container, a tubular member extending upwardly at a right angle from said distributer and opening into said distributer with its free end frictionally engaging the bottom of said container and surrounding the discharge opening therein, and means for varying the frictional contact between said tubular member and container to control the speed of the distributer and thereby regulate the discharge of feed therefrom.

In testimony whereof I have hereunto set my hand in presence of two subscribing witnesses.

LOUIS C. EDWARDS.

Witnesses:
CHARLES A. PINE,
MARSHALL E. CHARTER.

Copies of this patent may be obtained for five cents each, by addressing the "Commissioner of Patents, Washington, D. C."